(12) United States Patent
Jain et al.

(10) Patent No.: US 11,549,391 B2
(45) Date of Patent: Jan. 10, 2023

(54) COMPONENT FORMED FROM HYBRID MATERIAL

(71) Applicant: General Electric Company, Schenectady, NY (US)

(72) Inventors: Nitesh Jain, Bangalore (IN); Nicholas Joseph Kray, Mason, OH (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 17/207,911

(22) Filed: Mar. 22, 2021

(65) Prior Publication Data
US 2022/0298926 A1  Sep. 22, 2022

(51) Int. Cl.
*F01D 21/04* (2006.01)
(52) U.S. Cl.
CPC ........ F01D 21/045 (2013.01); *F05D 2220/32* (2013.01); *F05D 2230/31* (2013.01)
(58) Field of Classification Search
CPC . F01D 21/045; F05D 2220/32; F05D 2230/31
See application file for complete search history.

(56) References Cited

U.S. PATENT DOCUMENTS

| | | | | |
|---|---|---|---|---|
| 3,446,251 A | * | 5/1969 | Dow | D03D 13/002 139/383 R |
| 3,874,422 A | * | 4/1975 | Dow | D03D 13/004 139/383 R |
| 4,071,647 A | * | 1/1978 | McMullen | D04H 3/10 428/105 |
| 4,265,981 A | * | 5/1981 | Campbell | E04C 5/07 156/181 |
| 4,438,173 A | * | 3/1984 | Trost | D03D 13/002 428/221 |
| 4,528,051 A | * | 7/1985 | Heinze | D04H 3/115 156/92 |
| 4,534,698 A | * | 8/1985 | Tomich | F01D 21/045 415/121.2 |
| 5,229,196 A | | 7/1993 | Seibold et al. | |
| 5,437,538 A | * | 8/1995 | Mitchell | F41H 5/02 428/105 |
| 5,470,649 A | * | 11/1995 | Farley | B29C 70/023 428/924 |
| 5,542,626 A | | 8/1996 | Beuck et al. | |
| 5,580,643 A | | 12/1996 | Kennedy et al. | |
| 5,589,015 A | * | 12/1996 | Fusco | B29C 66/721 156/92 |

(Continued)

*Primary Examiner* — David E Sosnowski
*Assistant Examiner* — Theodore C Ribadeneyra
(74) *Attorney, Agent, or Firm* — Dority & Manning, P.A.

(57) ABSTRACT

Hybrid material components and methods of forming hybrid material components are provided. For example, a hybrid material component comprises a plurality of metallic tows and a plurality of non-metallic tows. Each metallic tow of the plurality of metallic tows is surrounded by a portion of the plurality of non-metallic tows such that the plurality of metallic tows are embedded within the plurality of non-metallic tows. An exemplary hybrid material component is a containment assembly of a gas turbine engine. Methods of forming such components include forming a hybrid material; laying up a plurality of layers of the material to form a layup; and processing the layup such that a plurality of metallic tows and a plurality of non-metallic tows are co-cured.

20 Claims, 4 Drawing Sheets

(56) References Cited

U.S. PATENT DOCUMENTS

| | | | |
|---|---|---|---|
| 7,285,326 B2 | 10/2007 | Schmidt et al. | |
| 7,628,879 B2 | 12/2009 | Ackerman | |
| 7,753,312 B2 | 7/2010 | Schmidt et al. | |
| 8,387,504 B2 | 3/2013 | Cairo et al. | |
| 8,443,706 B2* | 5/2013 | Egres, Jr. | F41H 5/0485 |
| | | | 87/8 |
| 9,840,936 B2* | 12/2017 | Lussier | B29C 70/226 |
| 10,500,811 B1* | 12/2019 | Schaedler | C23C 18/1653 |
| 2003/0203179 A1* | 10/2003 | Hawkins | B32B 3/08 |
| | | | 428/297.4 |
| 2005/0112347 A1 | 5/2005 | Schmidt et al. | |
| 2006/0201135 A1* | 9/2006 | Xie | F01D 21/045 |
| | | | 60/226.1 |
| 2009/0123269 A1* | 5/2009 | Bart | F01D 21/003 |
| | | | 415/118 |
| 2009/0155065 A1* | 6/2009 | Xie | F01D 11/122 |
| | | | 415/200 |
| 2010/0077721 A1* | 4/2010 | Marshall | F01D 21/045 |
| | | | 415/200 |
| 2012/0082541 A1* | 4/2012 | Macchia | F01D 25/246 |
| | | | 415/200 |
| 2012/0231202 A1* | 9/2012 | Takemura | B32B 38/04 |
| | | | 156/253 |
| 2012/0251305 A1* | 10/2012 | McMillan | F01D 5/282 |
| | | | 415/182.1 |
| 2013/0039774 A1 | 2/2013 | Viens et al. | |
| 2015/0167497 A1* | 6/2015 | Hannecart | F01D 25/243 |
| | | | 29/889.22 |
| 2016/0201505 A1* | 7/2016 | Clarkson | F01D 21/045 |
| | | | 415/200 |
| 2017/0057201 A1* | 3/2017 | M'Membe | B32B 7/08 |
| 2018/0162101 A1 | 6/2018 | Stickler et al. | |
| 2018/0162102 A1 | 6/2018 | Stickler et al. | |
| 2019/0030853 A1 | 1/2019 | Jakobi et al. | |
| 2019/0136711 A1* | 5/2019 | Worthoff | F01D 21/045 |
| 2019/0211705 A1* | 7/2019 | Kling | B32B 3/28 |

* cited by examiner

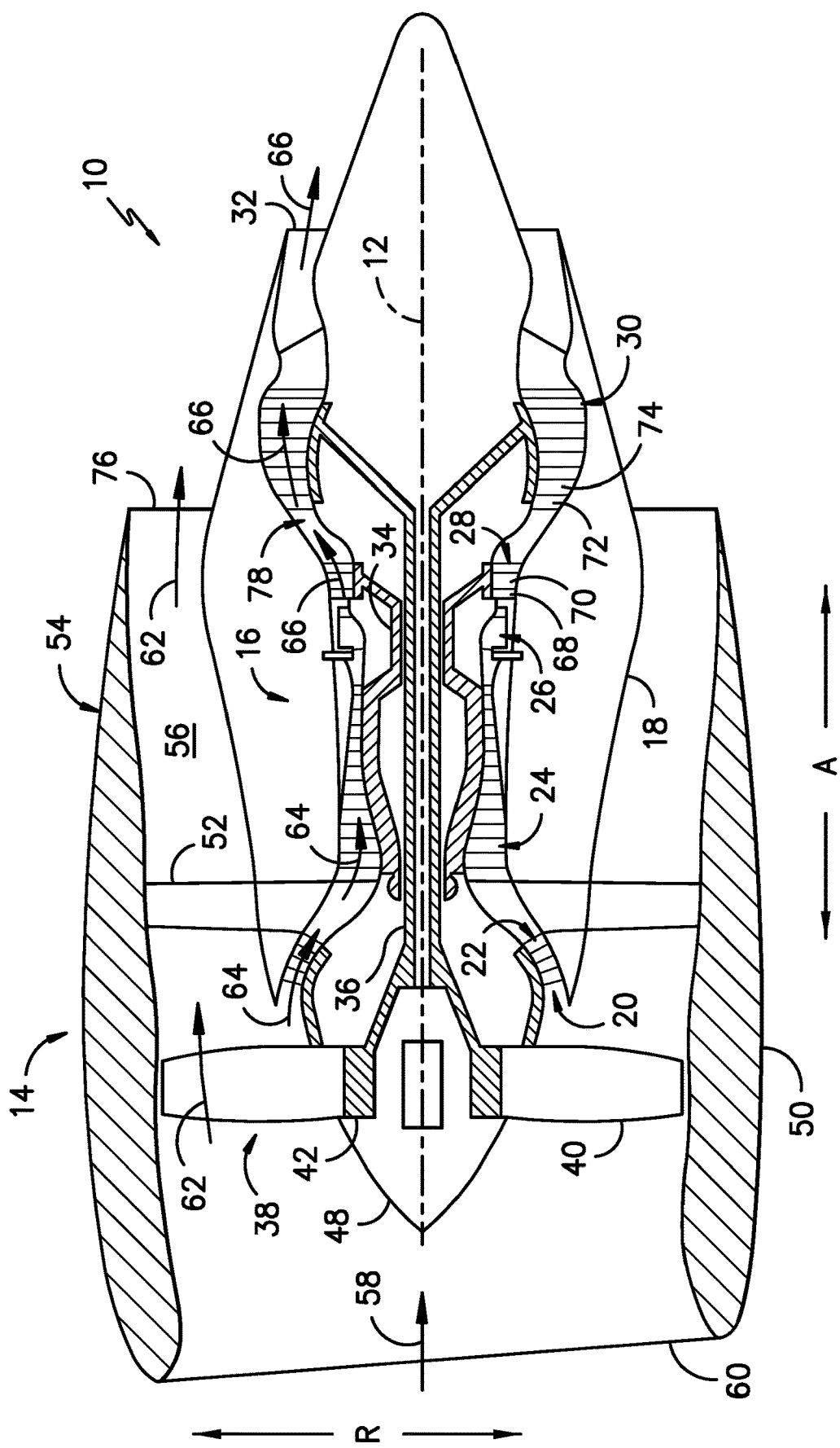
FIG. -1-

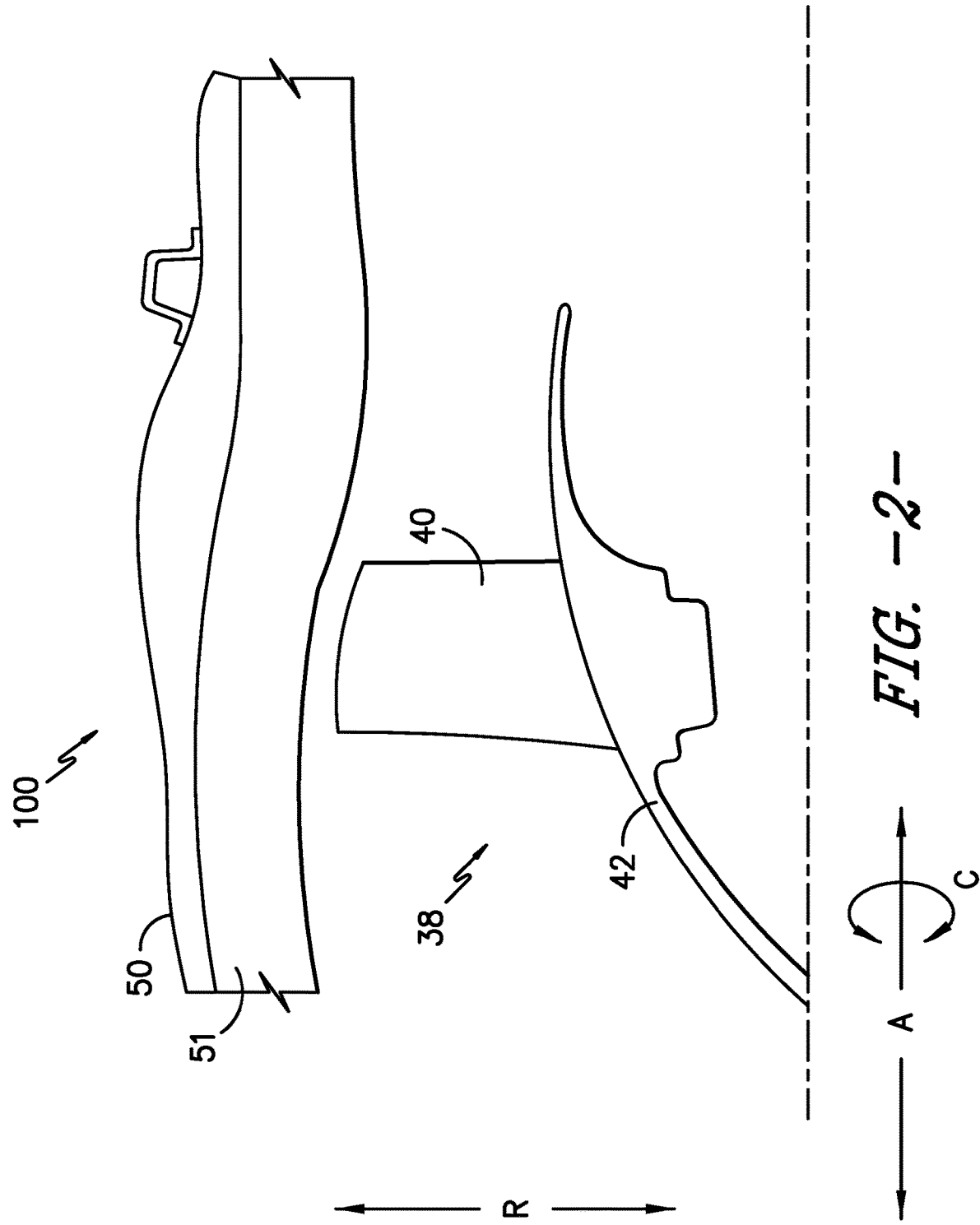

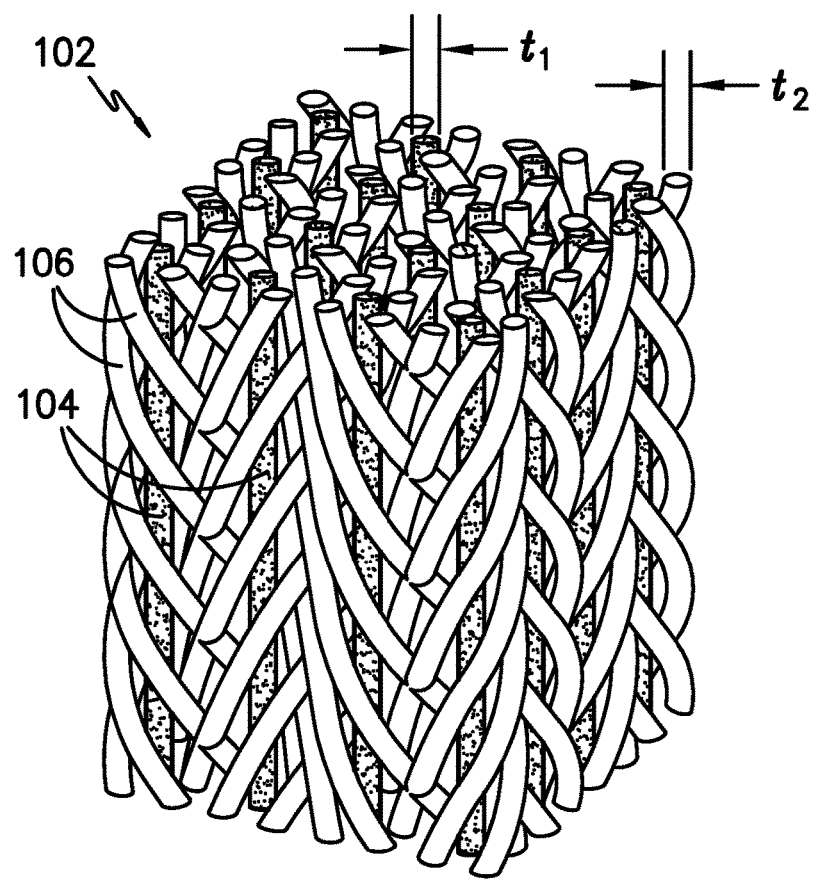
FIG. -3A-
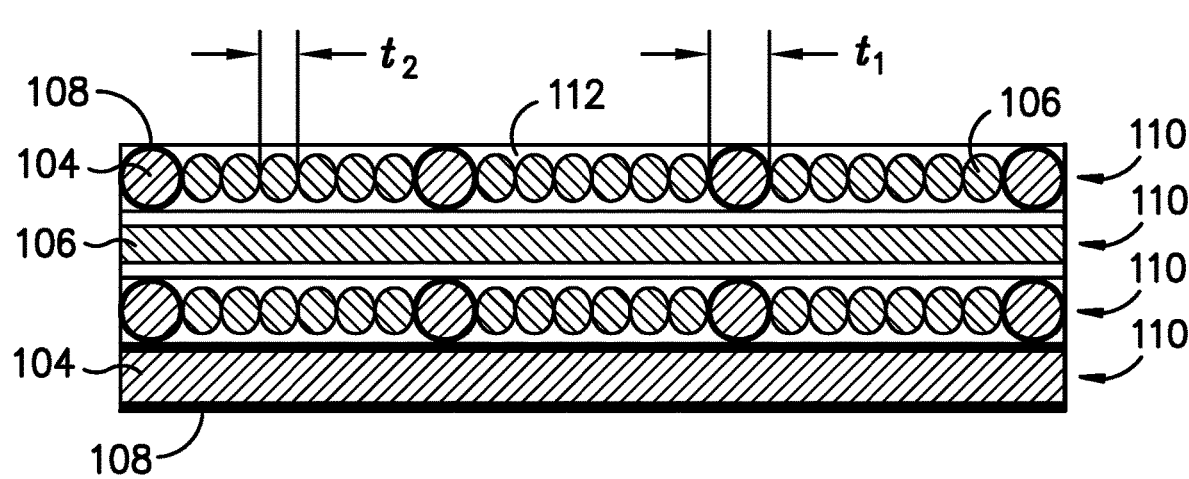
FIG. -3B-

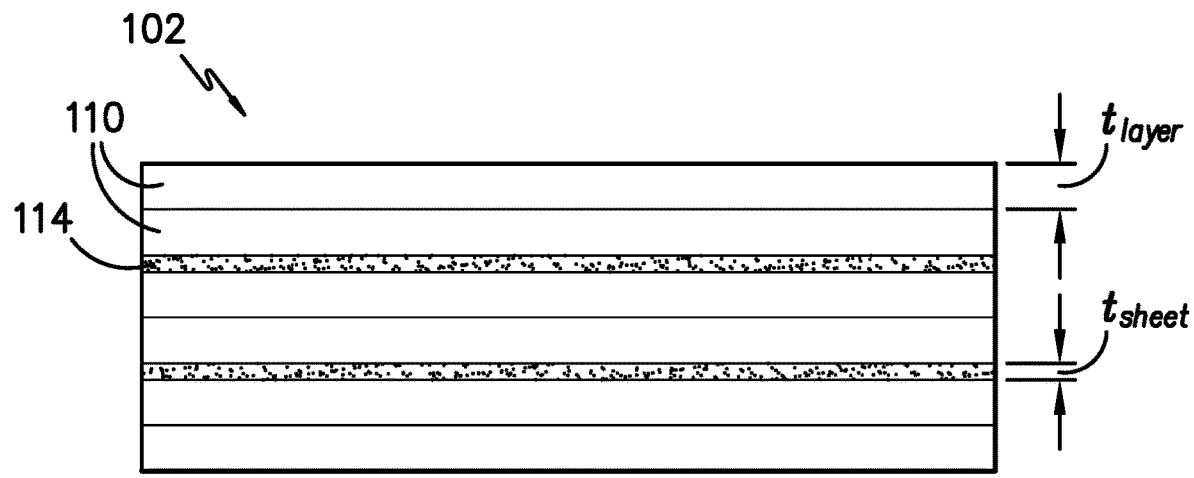
FIG. -4-
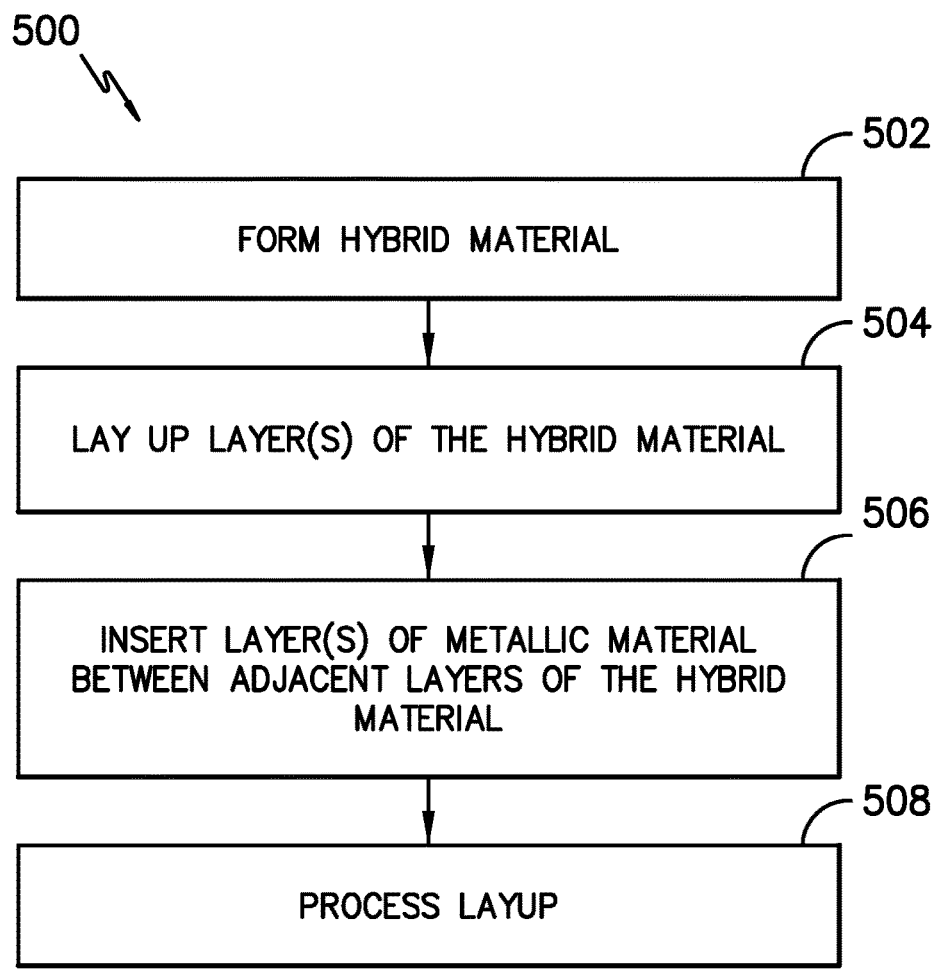
FIG. -5-

COMPONENT FORMED FROM HYBRID MATERIAL

FIELD

The present subject matter relates generally to components formed from hybrid materials. More particularly, the present subject matter relates to casings, such as fan case containment systems of gas turbine engines, formed from hybrid materials.

BACKGROUND

Aircraft gas turbine engines operate in various conditions and foreign objects may be ingested into the engine. During operation of the engine and, in particular, during movement of an aircraft powered by the engine, the fan blades may be impacted and damaged by foreign objects such as birds or debris picked up on a runway. Impacts on the fan blades may damage the blades and result in blade fragments or entire blades being dislodged and flying radially outward at relatively high velocity.

To limit or minimize damage from dislodged blades or blade fragments, some known engines include a metallic or composite casing or shell to facilitate increasing a radial and an axial stiffness of the engine and to facilitate reducing stresses near the engine casing penetration. To provide blade containment, most of the kinetic energy from a released blade or blade fragment must be absorbed by the casing or shell material. For smaller diameter engines, adequate containment capability may be achieved with a metallic "hardwall" case thick enough to resist penetration by blade fragments. A layer of composite material, such as a graphite epoxy polymer matrix composite, may be applied to the outer surface of the metallic case to bolster the containment ability of the case. Thus, the metal and composite elements of the case remain separate.

However, for larger diameter engines, a metallic case thick enough to resist penetration is prohibitively heavy. Therefore, either composite hardwall systems (which utilize a composite case rather than a metallic case) or composite "softwall" containment systems may be used for larger diameter engines. In a softwall system, a lightweight, high strength ballistic fabric, such as a fabric formed from aromatic polyamide fibers (e.g., Kevlar®), may be wrapped in multiple layers around a relatively thin support structure. In operation, a separated blade or blade fragment locally penetrates the support structure and strikes the fabric. The fabric layers are intended to capture and contain the blade or blade fragment. Conventional support structures may be fabricated of aluminum or fiber-reinforced composites based on weight considerations, e.g., the support structure may include aluminum honeycomb structures. Thus, like typical hardwall containment systems, typical softwall containment systems may utilize separate metal and composite materials to form the containment case.

Layering metal materials and composite materials in a containment system, in the manner typically utilized in hardwall and softwall containment systems, can increase the weight and cost of the engine in which the containment system is used. Further, all metallic containment systems or all composite (e.g., carbon) containment systems also can be relatively heavy and/or costly. Accordingly, improved containment casings or shells for gas turbine engines would be desirable. For instance, increasing the strength and energy absorption of containment assemblies without unduly increasing the weight and/or cost of the containment system would be desirable.

BRIEF DESCRIPTION

Aspects and advantages of the invention will be set forth in part in the following description, or may be obvious from the description, or may be learned through practice of the invention.

In one exemplary embodiment of the present subject matter, a containment assembly of a gas turbine engine is provided. The containment assembly comprises a containment case extending along an axial direction about a longitudinal centerline of the gas turbine engine. The containment case is formed from a hybrid material. The hybrid material includes a plurality of metallic tows and a plurality of non-metallic tows. Each metallic tow of the plurality of metallic tows is surrounded by non-metallic tows of the plurality of non-metallic tows such that the plurality of metallic tows are embedded within the plurality of non-metallic tows.

In another exemplary embodiment of the present subject matter, a hybrid material component of a gas turbine engine is provided. The hybrid material component comprises a plurality of metallic tows and a plurality of non-metallic tows. Each metallic tow of the plurality of metallic tows is surrounded by a portion of the plurality of non-metallic tows such that the plurality of metallic tows are embedded within the plurality of non-metallic tows.

In a further exemplary embodiment of the present subject matter, a method for forming a hybrid material component of a gas turbine engine is provided. The method comprises forming a hybrid material from a plurality of metallic tows intermixed with a plurality of non-metallic tows; laying up a plurality of layers of the hybrid material to form a hybrid material layup; and processing the hybrid material layup. Processing the hybrid material layup comprises curing the hybrid material layup such that the plurality of metallic tows and the plurality of non-metallic tows are co-cured.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 provides a schematic cross-section view of an exemplary gas turbine engine according to various embodiments of the present subject matter.

FIG. 2 provides a schematic cross-section view of a fan containment case assembly according to an exemplary embodiment of the present subject matter.

FIG. 3A provides a perspective view of a portion of a three-dimensional braided hybrid material according to an exemplary embodiment of the present subject matter.

FIG. 3B provides a schematic cross-section view of a portion of a hybrid material comprising a plurality of hybrid material layers according to an exemplary embodiment of the present subject matter.

FIG. 4 provides a schematic side view of a portion of a hybrid material comprising a plurality of hybrid material layers with metallic sheets disposed therebetween according to an exemplary embodiment of the present subject matter.

FIG. 5 provides a flow diagram illustrating a method for forming a containment assembly of a gas turbine engine.

DETAILED DESCRIPTION

Reference will now be made in detail to present embodiments of the invention, one or more examples of which are illustrated in the accompanying drawings. The detailed description uses numerical and letter designations to refer to features in the drawings. Like or similar designations in the drawings and description have been used to refer to like or similar parts of the invention.

As used herein, the terms "first," "second," and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a," "an," and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about," "approximately," and "substantially," are not to be limited to the precise value specified. In at least some instances, the approximating language may correspond to the precision of an instrument for measuring the value, or the precision of the methods or machines for constructing or manufacturing the components and/or systems. The approximating language may refer to being within a +/−1, 2, 4, 10, 15, or 20 percent margin in either individual values, range(s) of values, and/or endpoints defining range(s) of values.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

Generally, the present subject matter provides hybrid material components and, more particularly, components formed from a material that integrates metallic tows with non-metallic tows. The metallic tows may be surrounded by the non-metallic tows, e.g., by weaving or braiding together the metallic and non-metallic tows. As such, the hybrid material used to form the component may comprise an equal or greater volume fraction of non-metallic material than metallic material. The hybrid material may be used to form plies or preforms used to form a containment case, such as a fan case of a fan containment case assembly. The plies or preforms initially may be "dry" (e.g., metallic and non-metallic tows woven into a fabric or braided into a three-dimensional braid) or pre-impregnated with a matrix material. Moreover, the containment case can be functionally graded, optimizing the ratio of metallic tows to non-metallic tows throughout the containment case. Methods for forming hybrid material components also are provided.

Referring now to the drawings, wherein identical numerals indicate the same elements throughout the figures, FIG. 1 is a schematic cross-sectional view of a gas turbine engine in accordance with an exemplary embodiment of the present disclosure. More particularly, for the embodiment of FIG. 1, the gas turbine engine is a high-bypass turbofan jet engine 10, referred to herein as "turbofan engine 10." As shown in FIG. 1, the turbofan engine 10 defines an axial direction A (extending parallel to a longitudinal centerline 12 provided for reference) and a radial direction R. In general, the turbofan 10 includes a fan section 14 and a core turbine engine 16 disposed downstream from the fan section 14.

The exemplary core turbine engine 16 depicted generally includes a substantially tubular outer casing 18 that defines an annular inlet 20. The outer casing 18 encases, in serial flow relationship, a compressor section including a booster or low pressure (LP) compressor 22 and a high pressure (HP) compressor 24; a combustion section 26; a turbine section including a high pressure (HP) turbine 28 and a low pressure (LP) turbine 30; and a jet exhaust nozzle section 32. A high pressure (HP) shaft or spool 34 drivingly connects the HP turbine 28 to the HP compressor 24. A low pressure (LP) shaft or spool 36 drivingly connects the LP turbine 30 to the LP compressor 22.

For the depicted embodiment, fan section 14 includes a fan 38 having a plurality of fan blades 40 coupled to a disk or hub 42 in a spaced apart manner. As depicted, fan blades 40 extend outward from disk 42 generally along the radial direction R. The fan blades 40 and disk 42 are together rotatable about the longitudinal centerline 12 by LP shaft 36. In some embodiments, a power gear box having a plurality of gears may be included for stepping down the rotational speed of the LP shaft 36 to a more efficient rotational fan speed.

Referring still to the exemplary embodiment of FIG. 1, disk 42 is covered by rotatable front nacelle 48 aerodynamically contoured to promote an airflow through the plurality of fan blades 40. Additionally, the exemplary fan section 14 includes an annular fan casing or outer nacelle 50 that circumferentially surrounds the fan 38 and/or at least a portion of the core turbine engine 16. It should be appreciated that fan case (nacelle) 50 may be configured to be supported relative to the core turbine engine 16 by a plurality of circumferentially-spaced outlet guide vanes 52. Moreover, a downstream section 54 of the fan case 50 may extend over an outer portion of the core turbine engine 16 so as to define a bypass airflow passage 56 therebetween.

During operation of the turbofan engine 10, a volume of air 58 enters turbofan 10 through an associated inlet 60 of the fan case 50 and/or fan section 14. As the volume of air 58 passes across fan blades 40, a first portion of the air 58 as indicated by arrows 62 is directed or routed into the bypass airflow passage 56 and a second portion of the air 58 as indicated by arrows 64 is directed or routed into the LP compressor 22. The ratio between the first portion of air 62 and the second portion of air 64 is commonly known as a bypass ratio. The pressure of the second portion of air 64 is then increased as it is routed through the high pressure (HP) compressor 24 and into the combustion section 26, where it is mixed with fuel and burned to provide combustion gases 66.

The combustion gases 66 are routed through the HP turbine 28 where a portion of thermal and/or kinetic energy from the combustion gases 66 is extracted via sequential stages of HP turbine stator vanes 68 that are coupled to the outer casing 18 and HP turbine rotor blades 70 that are coupled to the HP shaft or spool 34, thus causing the HP shaft or spool 34 to rotate, thereby supporting operation of the HP compressor 24. The combustion gases 66 are then routed through the LP turbine 30 where a second portion of thermal and kinetic energy is extracted from the combustion gases 66 via sequential stages of LP turbine stator vanes 72 that are coupled to the outer casing 18 and LP turbine rotor blades 74 that are coupled to the LP shaft or spool 36, thus causing the LP shaft or spool 36 to rotate, thereby supporting operation of the LP compressor 22 and/or rotation of the fan 38.

The combustion gases 66 are subsequently routed through the jet exhaust nozzle section 32 of the core turbine engine 16 to provide propulsive thrust. Simultaneously, the pressure of the first portion of air 62 is substantially increased as the first portion of air 62 is routed through the bypass airflow passage 56 before it is exhausted from a fan nozzle exhaust section 76 of the turbofan 10, also providing propulsive thrust. The HP turbine 28, the LP turbine 30, and the jet exhaust nozzle section 32 at least partially define a hot gas path 78 for routing the combustion gases 66 through the core turbine engine 16.

In some embodiments, components of the turbofan engine 10 may comprise a composite material, such as a polymer matrix composite (PMC) material or a ceramic matrix composite (CMC) material, which has high temperature capability. Composite materials generally comprise a fibrous reinforcement material embedded in matrix material, e.g., a polymer or ceramic matrix material. The reinforcement material serves as a load-bearing constituent of the composite material, while the matrix of a composite material serves to bind the fibers together and act as the medium by which an externally applied stress is transmitted and distributed to the fibers.

PMC materials are typically fabricated by impregnating a fabric or unidirectional tape with a resin (prepreg), followed by curing. Prior to impregnation, the fabric may be referred to as a "dry" fabric and typically comprises a stack of two or more fiber layers (plies). The fiber layers may be formed of a variety of materials, nonlimiting examples of which include carbon (e.g., graphite), glass (e.g., fiberglass), polymer (e.g., aromatic polyamide or Kevlar®) fibers, and metal fibers. Fibrous reinforcement materials can be used in the form of relatively short chopped fibers, generally less than two inches in length, and more preferably less than one inch, or long continuous fibers, the latter of which are often used to produce a woven fabric or unidirectional tape. PMC materials can be produced by dispersing dry fibers into a mold, and then flowing matrix material around the reinforcement fibers, or by using prepreg. For example, multiple layers of prepreg may be stacked to the proper thickness and orientation for the part, and then the resin may be cured and solidified to render a fiber reinforced composite part. Resins for PMC matrix materials can be generally classified as thermosets or thermoplastics. Thermoplastic resins are generally categorized as polymers that can be repeatedly softened and flowed when heated and hardened when sufficiently cooled due to physical rather than chemical changes. Notable example classes of thermoplastic resins include nylons, thermoplastic polyesters, polyaryletherketones, and polycarbonate resins. Specific examples of high performance thermoplastic resins that have been contemplated for use in aerospace applications include polyetheretherketone (PEEK), polyetherketoneketone (PEKK), polyetherimide (PEI), and polyphenylene sulfide (PPS). In contrast, once fully cured into a hard rigid solid, thermoset resins do not undergo significant softening when heated but, instead, thermally decompose when sufficiently heated. Notable examples of thermoset resins include epoxy, bismaleimide (BMI), and polyimide resins.

In some embodiments, the "dry" fabric (i.e., an unimpregnated fabric) may be used as one or more layers of a component of the turbofan engine 10. For instance, a fabric may be formed from fibers of carbon, glass, polymer, and/or metal as described above. Without impregnating the fabric with a resin, layers of the fabric may be wrapped about other segments of the component, e.g., to impart certain characteristics to the component due to the fibers used to form the fabric.

As described in greater detail herein, the fan section 14 of the engine 10 includes a fan containment case assembly that includes the fan case 50 and that circumscribes and surrounds the fan 38 and the fan blades 40 to retain any fan blades 40 or fan blade fragments dislodged from the engine fan 38. A "blade-out event" or a fan blade-out (FBO) event arises when a fan blade or portion thereof is accidentally released from a rotor of a high-bypass turbofan engine. When suddenly released during flight, a fan blade can impact a surrounding fan case with substantial force, sometimes penetrating the fan case and travelling into the fan containment case assembly.

Referring to FIG. 2, a fan containment case assembly 100 is shown according to an exemplary embodiment of the present subject matter. The fan containment case assembly 100 includes the fan case 50, which extends along the axial direction A such that the fan case 50 is disposed about the longitudinal centerline 12 (FIG. 1), and may include a trench filler 51 on the interior of the fan case 50, e.g., to mitigate the effects of blade rub. For example, the trench filler 51 may be joined to the fan case 50 such that, within the assembly 100, the trench filler 51 is disposed radially inward of the fan case 50, i.e., the trench filler 51 is disposed along the radial direction R between the fan case 50 and the plurality of fan blades 40. The fan case 50 forms a radially outermost portion of the fan containment case assembly 100, helping contain objects travelling outward from continuing to travel beyond the fan section 14. Accordingly, the fan case 50 also may be referred to as containment case 50.

Referring to FIGS. 3A and 3B, the containment case 50 is formed from a material 102 in which a metal and a non-metal are integrated to form the material. For example, the material 102 may comprise metallic fibers and non-metallic fibers used as reinforcing fibers in composite materials such as ceramic matrix composites or polymer matrix composites. As such, the material may be referred to as an integral metal and composite material 102 or a hybrid material 102. The fan case or containment case 50 formed from the integral metal and composite or hybrid material 102 may be referred to as a hybrid material fan or containment case 50.

The hybrid material 102 includes a plurality of metallic tows 104 and a plurality of non-metallic tows 106. It will be appreciated that the term "tow" as used herein includes an untwisted bundle of continuous filaments or fibers. As shown in the exemplary embodiment of FIGS. 3A and 3B, the plurality of metallic tows 104 are intermixed with the plurality of non-metallic tows 106. More particularly, each metallic tow 104 of the plurality of metallic tows 104 is surrounded by non-metallic tows 106 such that the plurality of metallic tows 104 are embedded within the plurality of non-metallic tows 106. Stated differently, each metallic tow 104 is surrounded by a portion of the plurality of non-metallic tows 106 such that the plurality of metallic tows 104 are embedded within the plurality of non-metallic tows 106.

In the illustrated embodiment of FIG. 3A, the hybrid material 102 is a three-dimensional (3D) braided material. In other embodiments, the hybrid material 102 is a woven material. That is, the plurality of metallic tows 104 and the plurality of non-metallic tows 106 may be woven into a textile (e.g., formed as a fabric) such that the metallic tows 104 are embedded within or surrounded by the non-metallic tows 106. In still other embodiments, the metallic tows 104 and non-metallic tows 106 may be manipulated into any common form to fashion the hybrid metal/non-metal fan case 50, or hybrid material fan case 50. For instance, the tows 104, 106 may be stitched or manipulated into other three-dimensional weaves to form the hybrid material fan case 50.

A variety of metals, including metal alloys at the like, may be used for the metallic tows 104. In exemplary embodiments, the plurality of metallic tows 104 comprise aluminum-lithium (Al—Li) alloy tows. In other exemplary embodiments, the plurality of metallic tows 104 comprise steel tows. In yet other exemplary embodiments, the plurality of metallic tows 104 comprise titanium (Ti) tows. In still other exemplary embodiments, more than one metal may be used in the plurality of metallic tows 104. For instance, the plurality of metallic tows 104 may include a first plurality of metallic tows 104, which comprise aluminum-lithium (Al—Li) alloy tows, and a second plurality of metallic tows 104, which comprise steel tows. In suitable embodiments, a combination of two or more different types metallic fibers may be used to form the metallic tows 104, i.e., two or more different types of metallic fibers may be used to form a single tow 104. Other metals and combinations of metallic fibers or metallic tows 104 may be used as well.

Similarly, a variety of non-metallic materials may be used for the non-metallic tows 106. In particular, reinforcing fibers typically used in PMC materials may be selected for the non-metallic tows 106. In exemplary embodiments, the plurality of non-metallic tows 106 comprise carbon tows. In other exemplary embodiments, the plurality of non-metallic tows 106 comprise glass tows or aromatic polyamide tows. In yet other exemplary embodiments, more than one non-metallic fiber may be used in the plurality of non-metallic tows 106. For example, the plurality of non-metallic tows 106 may include a first plurality of non-metallic tows 106, which comprise carbon tows, and a second plurality of non-metallic tows 106, which comprise glass tows. In some embodiments, a combination of two or more different types non-metallic reinforcing fibers may be used to form the non-metallic tows 106, i.e., two or more different types non-metallic reinforcing fibers may be used to form a single tow 106. Other metals and combinations of metallic fibers or metallic tows 104 may be used as well.

In some embodiments, the metallic tows 104 may each include a protection layer or coating 108. That is, a protection layer 108 may surround each tow 104. Such layers or coatings may inhibit corrosion, etc. of the metallic material. For instance, in embodiments in which the plurality of metallic tows 104 include aluminum-lithium (Al—Li) alloy tows, the Al—Li tows 104 may comprise a galvanic protection layer 108. Other protective layers or coatings may be used as well, and the protection layer 108, or lack thereof, may correspond with the metal used to form the tows 104. For example, a first plurality of metallic tows 104 includes a first protection layer 108 and a second plurality of metallic tows 104 includes a second protection layer 108 (where the metal forming the first plurality of tows 104 is different from the metal forming the second plurality of tows 104 and the first protection layer 108 is different from the second protection layer 108), but a third plurality of metallic tows 104 does not include a protection layer 108.

In an exemplary embodiment, the plurality of metallic tows 104 comprise aluminum-lithium (Al—Li) alloy tows coated with a galvanic protection layer 108 and the plurality of non-metallic tows 106 comprise carbon tows. However, other combinations of metallic tows 104 and non-metallic tows 106 may be used to form the hybrid material 102. For example, in some embodiments, the hybrid material 102 comprises steel metallic tows 104 and carbon non-metallic tows 106, and in other embodiments, the material 102 comprises titanium (Ti) metallic tows 104 and carbon non-metallic tows 106. Other metallic tows 104 and non-metallic tows 106 may be used as well.

After weaving, braiding, or otherwise manipulating the plurality of tows 104, 106 into the hybrid material 102, the material 102 may be formed into a plurality of layers 110. The layers 110 may be used to form the fan case 50, or fan containment case 50. Each layer 110 comprises a plurality of metallic tows 104 and a plurality of non-metallic tows 106. When laid up, the layers 110 may be "dry" (e.g., metallic tows 104 and non-metallic tows 106 woven into a fabric or braided into a three-dimensional braid as shown in FIG. 3) or impregnated with a matrix material 112, such as a resin or other PMC matrix, as shown in FIG. 3B. If dry, the layers 110 are injected with matrix material 112 prior to curing, as described herein.

Turning to FIG. 4, in some embodiments, a sheet of metallic material 114 is disposed between adjacent layers 110 of the hybrid material 102. The metallic sheets 114 may be inserted between layers of woven or braided architecture, or between layers formed from other techniques, such as layers 110 of hybrid material 102. As shown in FIG. 4, in exemplary embodiments, the metallic sheet 114 is disposed between the hybrid layers 110 such that there are two hybrid layers 110 between each metallic sheet 114, i.e., the ratio of layers 110 to metallic sheets 114 is two to one (2:1). Other ratios of layers 110 to metallic sheets 114 may be used as well, for example, 3:1, 4:1, or greater.

Further, the hybrid layers 110 may be thicker than the metallic sheet 114, i.e., the metallic sheet 114 may have a sheet thickness $t_{sheet}$ that is smaller or less than a layer thickness $t_{layer}$ of each layer 110 (stated differently, the layer thickness $t_{layer}$ is larger or greater than the sheet thickness $t_{sheet}$, such that $t_{layer} > t_{sheet}$). Accordingly, in embodiments in which the ratio of layers 110 to metallic sheets 114 is 2:1, the hybrid material 102 comprises two relatively thick layers 110 for every relatively thin metallic sheet 114. Moreover, the metallic sheets 114 may be formed from any suitable metallic material, such as the metals described with respect to metallic tows 104, e.g., an aluminum-lithium (Al—Li) alloy, steel, titanium (Ti), or any other suitable metallic material.

Referring again to FIGS. 3A and 3B, different thickness or diameter tows 104, 106 may be used to form the hybrid material 102. In some embodiments, each metallic tow 104 of the plurality of metallic tows 104 has a first tow thickness or diameter $t_1$, each non-metallic tow 106 of the plurality of non-metallic tows 106 has a second tow thickness or diameter $t_2$, and the first tow thickness or diameter $t_1$ is different from the second tow thickness or diameter $t_2$. In some embodiments, the first tow thickness $t_1$ is larger than the second tow thickness $t_2$, but in other embodiments, the second tow thickness $t_2$ is larger than the first tow thickness $t_1$. In still other embodiments, the thickness or diameter of the metallic tows 104 may vary among the plurality of metallic tows 104, and the thickness or diameter of the non-metallic tows 106 may vary among the plurality of non-metallic tows 106. The first tow thickness or diameter $t_1$, or the thickness/diameter of the metallic tows 104, may be within a range from about 3 microns or 0.003 mm (0.003 millimeters) to about 0.400 mm, or within a range of about 5 microns or 0.005 mm to about 0.325 mm. The second tow thickness or diameter $t_2$, or the thickness/diameter of the non-metallic tows 106, may be within a range from about 0.100 mm to about 0.500 mm, or within a range of about 0.200 mm to about 0.425 mm. Varying the thickness or diameter of the tows 104, 106 (whether between metallic tows 104 and non-metallic tows 106 and/or within the plurality of metallic tows 104 and/or the plurality of non-metallic tows 106) may vary the characteristics of the hybrid material 102.

The hybrid material 102 may comprise different amounts of metallic tows 104 and non-metallic tows 106. More specifically, the plurality of metallic tows 104 is a metal volume fraction of the hybrid material 102, and the remaining volume of the material 102 is the non-metallic portion of the material, i.e., the plurality of non-metallic tows 106 and the matrix material 112, such as an epoxy resin. That is, together the metal volume fraction and the non-metallic tows 106 and matrix material 112 form the total volume of the material 102. In exemplary embodiments, the metal volume fraction is within a range of about 5% to about 50% of the total volume, and more particularly, the metal volume fraction is within a range of about 10% to about 30% of the total volume. As examples, in one embodiment, the metal volume fraction is approximately 10%, and in another embodiment, the metal volume fraction is approximately 25%. As further examples, in one embodiment, the metal volume fraction is at least 5% or at least 10% but less than the combined volume fraction of the non-metallic tows 106 and matrix material 112, or the metal volume fraction is at least 5% or at least 10% but less than the volume fraction of the non-metallic tows 106.

Further, in some embodiments, the metal volume fraction may vary throughout the fan containment case assembly 100, e.g., the metal volume fraction may vary circumferentially, axially, and/or radially. For instance, the fan case 50 or hybrid material 102 may be referred to as a functionally graded material (FGM), where the composition and/or structure of the fan case 50 or the material 102 is gradually varied over its volume, resulting in corresponding changes in the properties of the fan case 50 or the material 102. As described herein, the hybrid material 102 may be formed into a plurality of layers that are used to construct the hybrid fan case 50. Accordingly, a ratio of metallic tows 104 to non-metallic tows 106, or a ratio of metallic tows 104 to the non-metallic tows 106 and matrix material 112, can be optimized, e.g., by using layers with different metal volume fractions to form the material 102 and thereby to construct the fan case 50. As such, a functionally graded fan containment case assembly 100 can be produced, having increased strength at certain locations, e.g., at a leading edge impact zone or a root impact zone or at an inner surface of the fan case 50. More particularly, the fan case 50 may be segmented into circumferential zones, axial zones, and/or radial zones, and the volume fraction of metallic tows 104 (i.e., the metal volume fraction) may be greater in one or more such zones that in other such zones. As an example, through testing, analysis of FBO events, etc., a plurality of zones that are circumferentially spaced apart from one another may be identified as having a greater potential for impact by an object than a remainder of the fan case 50. The volume fraction of metallic tows 104 (i.e., the metal volume fraction) within the fan case 50 at the plurality of circumferential zones is greater than the metal volume fraction at least at circumferential locations between the plurality of circumferential zones. For instance, the metal volume fraction may be 25% or greater in the plurality of circumferential zones and 10% or less in the remainder of the fan case 50.

As another example, the volume fraction of metallic tows 104 may vary radially, e.g., the metal volume fraction may taper from an inner portion of the fan case 50 to an outer portion of the fan case 50. In an exemplary embodiment, the fan case 50 includes a greater proportion of the metallic tows 104 at an inner surface 118 of the fan case 50 than at a location within the fan case 50 that is radially outward from the inner surface 118. For instance, the proportion of metallic tows 104 within the fan case 50 may decrease from the inner surface 118 to an outer surface 120 of the fan case 50. As yet another example, the volume fraction of metallic tows 104 may vary axially, e.g., the metal volume fraction may be greater at one or more axial locations of the fan case 50 than at the remaining axial locations along the fan case 50. Thus, the volume fraction of metallic tows 104 may be varied through the fan case 50 to optimize the characteristics of the fan case 50 to resist damage, e.g., cutting, piercing, etc., by objects impacting the assembly 100.

In some embodiments, the fan containment case assembly 100 also includes the inlet 60 of the fan section 14. As previously described, the inlet 60 is upstream of the fan case 50. As such, the inlet 60 may be formed separately from the fan case 50 and comprise the hybrid material 102. By incorporating the material 102 in the inlet 60, the inlet 60 would also benefit from improved fragment damage resistance. Thus, the damage resistance of the entire fan section 14 can be improved by incorporating the hybrid material 102 into the containment casing, e.g., the fan case 50 as well as the inlet 60.

Turning now to FIG. 5, a flow diagram is provided illustrating an exemplary method 500 for forming a hybrid material component of a gas turbine engine, such as a fan containment case 50 of turbofan engine 10. As shown at 502, the exemplary method 500 includes forming a hybrid material 102, which integrates metal and composite materials, from a plurality of metallic tows 104 intermixed with a plurality of non-metallic tows 106. More particularly, each metallic tow 104 may be surrounded a plurality of the non-metallic tows 106 such that the metallic material (i.e., metallic tows 104) is embedded within the non-metallic composite material (i.e., non-metallic tows 106). As described herein, the metallic tows 104 may be formed from any suitable metallic material, and the non-metallic tows 106 may be formed from any suitable composite fiber material. Further, forming the hybrid material 102 may include weaving together the metallic tows 104 and non-metallic tows 106 to form a hybrid fabric or cloth, or braiding together the metallic tows 104 and non-metallic tows 106 to form a three-dimensional (3D) braid. The woven or braided hybrid material 102 may be referred to as preforms, which may be cut into a plurality of plies or layers 110. Alternatively, the metallic tows 104 and non-metallic tows 106 may be impregnated with a matrix material 112, forming a tape that may be cut into a plurality of hybrid material plies or layers 110.

Referring to 504 in FIG. 5, the method 500 also includes laying up a plurality of layers 110 of the hybrid material 102 to form a hybrid material layup. The layers 110 may be laid up to alternate the fiber directions of the plurality of fibers within the tows 104, 106, or the layers 110 may be laid up such that the fibers within the tows 104, 106 are substantially unidirectional. In some embodiments, the hybrid material layup defines the shape of the hybrid material component. For example, where the hybrid material component is a hybrid composite fan case 50, the hybrid material layup may have a generally cylindrical shape. For "dry" layers 110, laying up the plurality of layers 110 also comprises injecting the hybrid material layup with the matrix material 112, such as an epoxy resin as described herein. For prepreg layers 110, the matrix material 112 is part of each layer 110 such that injecting the layup with matrix material 112 is not required.

As illustrated at 506 in FIG. 5, in some embodiments, the method 500 comprises inserting a layer or sheet 114 of metallic material between adjacent layers 110 of the hybrid material 102. As described herein, the metallic sheet 114 may be thinner than the hybrid material layers 110, e.g., the metallic sheet 114 may have a sheet thickness $t_{sheet}$ that is less than a layer thickness $t_{layer}$ of the hybrid material layers 110. Further, in some embodiments, the hybrid material layup may comprise two hybrid material layers 110 for every metallic sheet 114 such that the hybrid material layup has a 2:1 ratio of layers 110 to layers 114.

As shown at 508 in FIG. 5, the exemplary method 500 further includes processing the hybrid material layup. At least in part, processing the hybrid material layup comprises curing the layup such that the plurality of metallic tows 104 and the plurality of non-metallic tows 106 are co-cured. In some embodiments, the hybrid material layup may be resin transfer molded (RTM) or vacuum assisted resin transfer molded (VARTM).

Thus, forming the hybrid material component may comprise steps similar to those used in forming a composite component, such as a component formed from PMC material. As one example, metallic tows 104 and non-metallic tows 106 may be impregnated with matrix material 112, and the resulting composition cut into layers or plies 110 of the hybrid material 102. As another example, the metallic tows 104 and non-metallic tows 106 may be woven or braided into a three dimensional preform, which may be cut into layers or plies 110 of the hybrid material 102. Forming the hybrid material component, such as a hybrid material fan containment case 50, may then include laying up a plurality of the hybrid composite plies 110, layer by layer, building a ply layup. It will be understood that the ply layup may be formed by laying up the hybrid plies on a tool, mandrel, or other support. Then, the ply layup may undergo thermal and/or chemical processing to form the component. For example, the hybrid material ply layup may be debulked and consolidated, e.g., at elevated temperatures and pressures in an autoclave, before undergoing densification and final curing. As such, the metallic material and non-metallic (e.g., composite) material are co-cured to produce the hybrid material component. In some embodiments, processing the hybrid material ply layup may include a resin transfer molding process or a vacuum assisted resin transfer molding process, such that the resulting hybrid material component may be referred to as resin transfer molded (RTM) or vacuum assisted resin transfer molded (VARTM). Specific processing techniques and parameters for the thermal and/or chemical processing of the ply layup will depend on the particular composition of the materials used to form the plies. As an example, other known methods or techniques for curing composite plies may be utilized. Further, as described herein, the metallic tows 104 may be disposed at one or more particular locations in the containment case in a greater proportion or concentration that at other locations in the containment case.

In embodiments in which the hybrid material component is a hybrid composite fan containment case 50, after the containment case is formed, the other components of the fan containment case assembly 100 may be assembled to form the assembly 100. In particular, the trench filler 51 may be joined, attached, or coupled to, or otherwise disposed against, the hybrid material fan case 50 to form the fan containment case assembly 100. The assembly 100 may then be slid over the fan 38, or the fan 38 may be inserted or assembled within the fan containment case assembly 100.

Of course, the hybrid material component may be another or different component than a fan case. For instance, it will be appreciated that the integral metal/composite or hybrid material 102 may be formed as described herein and then used to make or construct one or more gas turbine engine components, in addition to or instead of the fan case 50.

Accordingly, the present subject matter is directed to components, and methods of forming components, comprising an integral metal and composite material, also referred to as a hybrid material. As described herein, by integrating metal fibers with non-metallic fibers within a braided or woven material may increase the strength and/or energy absorption of the component without unduly increasing the weight and/or cost of the component, e.g., compared to a component formed from separate metallic and composite material sections, a completely metallic component, or a completely composite component. Fan casings or containment systems may be formed from such a hybrid material, e.g., to improve blade containment in a fan blade-out event. More particularly, the present subject matter provides fan containment case assemblies, and methods for forming such assemblies, that utilize integral carbon and metal (e.g., Al—Li) tows for a woven or braided architecture to create hybrid construction fan containment case assemblies. In some embodiments, the hybrid construction may comprise metallic sheets inserted between layers of the woven/braided architecture. The hybrid structure, comprising tows formed from carbon and metal, can have high strength and can help in energy absorption in the event of fan blade out (FBO), which may help contain a fan blade and/or its fragments in an FBO event. Further, the hybrid structure has a reduced weight and cost compared to, e.g., an all carbon fan case. Other benefits and advantages of the present subject matter may be realized as well.

Further aspects of the invention are provided by the subject matter of the following clauses:

1. A containment assembly of a gas turbine engine comprising a containment case extending along an axial direction about a longitudinal centerline of the gas turbine engine, the containment case formed from a hybrid material, the hybrid material including a plurality of metallic tows and a plurality of non-metallic tows, wherein each metallic tow of the plurality of metallic tows is surrounded by non-metallic tows of the plurality of non-metallic tows such that the plurality of metallic tows are embedded within the plurality of non-metallic tows.

2. The containment assembly of any preceding clause, wherein the hybrid material is a three-dimensional braided material.

3. The containment assembly of any preceding clause, wherein the hybrid material is a woven material.

4. The containment assembly of any preceding clause, wherein the plurality of metallic tows comprise aluminum-lithium (Al—Li) alloy tows.

5. The containment assembly of any preceding clause, wherein the aluminum-lithium (Al—Li) alloy tows comprise a galvanic protection layer.

6. The containment assembly of any preceding clause, wherein the plurality of non-metallic tows comprise carbon tows.

7. The containment assembly of any preceding clause, wherein the plurality of metallic tows comprise steel tows.

8. The containment assembly of any preceding clause, wherein the plurality of metallic tows comprise titanium (Ti) tows.

9. The containment assembly of any preceding clause, wherein the plurality of non-metallic tows comprise carbon tows.

10. The containment assembly of any preceding clause, wherein each metallic tow of the plurality of metallic tows has a first thickness and each non-metallic tow of the plurality of non-metallic tows has a second thickness, and wherein the first thickness is different from the second thickness.

11. The containment assembly of any preceding clause, wherein the hybrid material is formed in a plurality of layers, and wherein a sheet of metallic material is disposed between adjacent layers of the hybrid material.

12. The containment assembly of any preceding clause, wherein the hybrid material comprises about 5% to about 50% metal by volume.

13. The containment assembly of any preceding clause, wherein the hybrid material comprises about 10% to about 30% metal by volume.

14. The containment assembly of any preceding clause, wherein the containment assembly surrounds a plurality of fan blades attached to a disk, each fan blade of the plurality of fan blades extending along a radial direction, and wherein the disk is rotatable about the longitudinal centerline.

15. The containment assembly of any preceding clause, further comprising a trench filler joined to the containment case, the trench filler disposed radially inward of the containment case such that the trench filler is disposed along the radial direction between the containment case and the plurality of fan blades.

16. The containment assembly of any preceding clause, wherein a volume fraction of the metallic tows in the hybrid material varies radially, axially, or circumferentially.

17. The containment assembly of any preceding clause, wherein the volume fraction of the metallic tows decreases from a radially inner portion of the containment case to a radially outer portion of the containment case.

18. The containment assembly of any preceding clause, wherein the volume fraction of the metallic tows decreases from an inner surface of the containment case to a location within the containment case that is radially outward from the inner surface.

19. The containment assembly of any preceding clause, wherein the volume fraction of the metallic tows decreases from an inner surface of the containment case to an outer surface of the containment case.

20. The containment assembly of any preceding clause, wherein the volume fraction of the metallic tows is greater at one axial location than at another axial location of the containment case.

21. The containment assembly of any preceding clause, wherein the volume fraction of the metallic tows at a plurality of zones circumferentially spaced apart from one another is greater than the volume fraction of the metallic tows at circumferential locations between the plurality of zones.

22. The containment assembly of any preceding clause, wherein a volume fraction of the metallic tows in the hybrid material is at least 5% of a total volume of the hybrid material but less than a combined volume fraction of the non-metallic tows and a matrix material.

23. The containment assembly of any preceding clause, wherein a volume fraction of the metallic tows in the hybrid material is at least 10% of a total volume of the hybrid material but less than a combined volume fraction of the non-metallic tows and a matrix material.

24. The containment assembly of any preceding clause, wherein a volume fraction of the metallic tows in the hybrid material is at least 5% of a total volume of the hybrid material but less than a volume fraction of the non-metallic tows.

25. The containment assembly of any preceding clause, wherein a volume fraction of the metallic tows in the hybrid material is at least 10% of a total volume of the hybrid material but less than a volume fraction of the non-metallic tows.

26. A hybrid material component of a gas turbine engine comprising a plurality of metallic tows and a plurality of non-metallic tows, wherein each metallic tow of the plurality of metallic tows is surrounded by a portion of the plurality of non-metallic tows such that the plurality of metallic tows are embedded within the plurality of non-metallic tows.

27. The containment assembly of any preceding clause, wherein the plurality of metallic tows are braided with the plurality of non-metallic tows into a three-dimensional braided material, and wherein the plurality of metallic tows comprise an aluminum-lithium (Al—Li) alloy and the plurality of non-metallic tows comprise carbon.

28. The containment assembly of any preceding clause, wherein the plurality of metallic tows are woven with the plurality of non-metallic tows into a woven fabric material, and wherein the plurality of metallic tows comprise an aluminum-lithium (Al—Li) alloy and the plurality of non-metallic tows comprise carbon.

29. The containment assembly of any preceding clause, wherein the plurality of metallic tows and the plurality of non-metallic tows are formed into a plurality of layers, and wherein the plurality of layers form a fan containment case of the gas turbine engine.

30. A method for forming a hybrid material component of a gas turbine engine comprising forming a hybrid material from a plurality of metallic tows intermixed with a plurality of non-metallic tows; laying up a plurality of layers of the hybrid material to form a hybrid material layup; and processing the hybrid material layup, wherein processing the hybrid material layup comprises curing the hybrid material layup such that the plurality of metallic tows and the plurality of non-metallic tows are co-cured.

31. The method of any preceding clause, wherein each metallic tow of the plurality of metallic tows is surrounded by metallic tows of the plurality of non-metallic tows such that the metallic tows are embedded within the non-metallic tows.

32. The method of any preceding clause, wherein laying up a plurality of layers of the hybrid material comprises alternating fiber directions of a plurality of metallic fibers within the plurality of metallic tows with a plurality of non-metallic fibers within the plurality of non-metallic tows.

33. The method of any preceding clause, wherein laying up a plurality of layers of the hybrid material comprises laying up the plurality of layers such that fibers within each of the plurality of metallic tows and the plurality of non-metallic tows are unidirectional.

34. The method of any preceding clause, wherein the hybrid material layup has a generally cylindrical shape.

35. The method of any preceding clause, further comprising inserting a sheet of metallic material between adjacent layers of the hybrid material.

36. The method of any preceding clause, wherein the hybrid material layup comprises two layers of the hybrid material for every sheet of metallic material.

37. The method of any preceding clause, wherein the hybrid material layup is resin transfer molded (RTM) as part of processing the hybrid material layup.

38. The method of any preceding clause, wherein the hybrid material layup is vacuum assisted resin transfer molded (VARTM) as part of processing the hybrid material layup.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims if they include structural elements that do not differ from the literal language of the claims or if they include equivalent structural elements with insubstantial differences from the literal language of the claims.

What is claimed is:

1. A containment assembly of a gas turbine engine, comprising:
   a containment case extending along an axial direction about a longitudinal centerline of the gas turbine engine, the containment case formed from a hybrid material, the hybrid material including a plurality of metallic tows and a plurality of non-metallic tows,
   wherein each metallic tow of the plurality of metallic tows is surrounded by non-metallic tows of the plurality of non-metallic tows such that the plurality of metallic tows are embedded within the plurality of non-metallic tows, and
   wherein each metallic tow of the plurality of metallic tows has a length and each non-metallic tow of the plurality of non-metallic tows has a length, the length of each metallic tow of the plurality of metallic tows extending in generally the same direction as the length of each non-metallic tow of the plurality of non-metallic tows.

2. The containment assembly of claim 1, wherein the hybrid material is a three-dimensional braided material.

3. The containment assembly of claim 1, wherein the hybrid material is a woven material.

4. The containment assembly of claim 1, wherein the plurality of metallic tows comprise aluminum-lithium (Al—Li) alloy tows.

5. The containment assembly of claim 4, wherein the aluminum-lithium (Al—Li) alloy tows comprise a galvanic protection layer.

6. The containment assembly of claim 5, wherein the plurality of non-metallic tows comprise carbon tows.

7. The containment assembly of claim 1, wherein the plurality of metallic tows comprise steel tows or titanium (Ti) tows.

8. The containment assembly of claim 1, wherein the plurality of non-metallic tows comprise carbon tows.

9. The containment assembly of claim 1, wherein each metallic tow of the plurality of metallic tows has a first thickness and each non-metallic tow of the plurality of non-metallic tows has a second thickness, and wherein the first thickness is different from the second thickness.

10. The containment assembly of claim 1, wherein the hybrid material is formed in a plurality of layers, and wherein a sheet of metallic material is disposed between adjacent layers of the hybrid material.

11. The containment assembly of claim 1, wherein the hybrid material comprises 5% to 50% metal by volume.

12. The containment assembly of claim 11, wherein the hybrid material comprises 10% to 30% metal by volume.

13. The containment assembly of claim 1, wherein the containment assembly surrounds a plurality of fan blades attached to a disk, each fan blade of the plurality of fan blades extending along a radial direction, and wherein the disk is rotatable about the longitudinal centerline.

14. The containment assembly of claim 13, further comprising:
   a trench filler joined to the containment case, the trench filler disposed radially inward of the containment case such that the trench filler is disposed along the radial direction between the containment case and the plurality of fan blades.

15. The containment assembly of claim 13, wherein a volume fraction of the metallic tows in the hybrid material varies radially, axially or circumferentially.

16. A hybrid material component of a gas turbine engine, comprising:
   a plurality of metallic tows; and
   a plurality of non-metallic tows,
   wherein each metallic tow of the plurality of metallic tows is surrounded by a portion of the plurality of non-metallic tows such that the plurality of metallic tows are embedded within the plurality of non-metallic tows, and
   wherein each metallic tow of the plurality of metallic tows has a length and each non-metallic tow of the plurality of non-metallic tows has a length, the length of each metallic tow of the plurality of metallic tows extending in generally the same direction as the length of each non-metallic tow of the plurality of non-metallic tows.

17. The containment assembly of claim 16, wherein the plurality of metallic tows are braided with the plurality of non-metallic tows into a three-dimensional braided material, and wherein the plurality of metallic tows comprise an aluminum-lithium (Al—Li) alloy and the plurality of non-metallic tows comprise carbon.

18. The containment assembly of claim 16, wherein the plurality of metallic tows are woven with the plurality of non-metallic tows into a woven fabric material, and wherein the plurality of metallic tows comprise an aluminum-lithium (Al—Li) alloy and the plurality of non-metallic tows comprise carbon.

19. The containment assembly of claim 16, wherein the plurality of metallic tows and the plurality of non-metallic tows are formed into a plurality of layers, and wherein the plurality of layers form a fan containment case of the gas turbine engine.

20. A method for forming a hybrid material component of a gas turbine engine, comprising:
- forming a hybrid material from a plurality of metallic tows intermixed with a plurality of non-metallic tows, each metallic tow of the plurality of metallic tows having a length and each non-metallic tow of the plurality of non-metallic tows having a length, the length of each metallic tow of the plurality of metallic tows extending in generally the same direction as the length of each non-metallic tow of the plurality of non-metallic tows;
- laying up a plurality of layers of the hybrid material to form a hybrid material layup; and
- processing the hybrid material layup,
- wherein processing the hybrid material layup comprises curing the hybrid material layup such that the plurality of non-metallic tows are cured when intermixed with the plurality of metallic tows.

* * * * *